(12) United States Patent
Dahl

(10) Patent No.: US 6,655,895 B1
(45) Date of Patent: Dec. 2, 2003

(54) HIGH-STRENGTH VEHICLE-MOUNTED CARGO TRANSPORT APPARATUS

(76) Inventor: Gilbert L. Dahl, P.O. Box 2399, 8502 Auto Plane Dr., Carefree, AZ (US) 85377

( * ) Notice: Subject to any disclaimer, the term of this patent is extended or adjusted under 35 U.S.C. 154(b) by 85 days.

(21) Appl. No.: 09/792,269

(22) Filed: Feb. 23, 2001

(51) Int. Cl.⁷ .................................................. B60P 1/00
(52) U.S. Cl. ........................ 414/462; 414/540; 224/525
(58) Field of Search ................. 414/462, 540; 224/521, 497, 499, 501, 525

(56) References Cited

U.S. PATENT DOCUMENTS

| | | | |
|---|---|---|---|
| 4,084,736 A | 4/1978 | Jacobs, Jr. | |
| 4,738,581 A | 4/1988 | Kuhlman | |
| 4,741,660 A | 5/1988 | Kent | |
| 4,775,282 A | 10/1988 | Van Vliet | |
| 5,011,361 A | 4/1991 | Peterson | |
| 5,415,516 A * | 5/1995 | Richards | 414/540 |
| 5,427,289 A * | 6/1995 | Ostor | 414/462 |
| 5,431,522 A | 7/1995 | Ross | |
| 5,456,564 A * | 10/1995 | Bianchini | 224/521 |
| 5,482,424 A | 1/1996 | Jones et al. | |
| 5,806,737 A | 9/1998 | Clark | |
| 5,816,763 A | 10/1998 | Hamann et al. | |
| 5,857,824 A * | 1/1999 | De Aquiar | 414/462 |
| 5,938,395 A * | 8/1999 | Dumont, Jr. | 414/462 |
| 5,984,613 A | 11/1999 | Motilewa | |
| 6,007,290 A | 12/1999 | Schulz et al. | |
| D430,533 S | 9/2000 | Peschmann et al. | |
| 6,176,672 B1 * | 1/2001 | Egan et al. | 414/462 |

* cited by examiner

Primary Examiner—Kathy Matecki
Assistant Examiner—Sang Kim
(74) Attorney, Agent, or Firm—Ellis & Venable, P.C.; Lance C. Venable; Joseph R. Meaney (57) ABSTRACT

The invention is a vehicle-mounted cargo transport apparatus and a method for mounting the cargo transport apparatus on a vehicle is such a way that increases both the loading capacity and stability of the cargo transport apparatus. At a minimum, the cargo transport apparatus comprises a lifting device and at least one load-bearing member. The lifting device is connected to the vehicle and has a cargo holding area, such as a platform, connected to the lifting device for loading cargo. The cargo holding area has at least two positions: a traveling position and a loading position. Cargo is loaded onto the cargo holding area in the loading position and then raised to a vertical position above the traveling position. At least one load beam, preferably two load beams, are then connected to the vehicle in a location where the load-supporting member can support the lifting device in the traveling position. If more than one load-supporting member is used, both the load-bearing members should be spaced apart so that the load is evenly distributed between them. After the load beam(s) are in place, the cargo holding device is lowered onto the load beam(s) so that the load beams at least share the load of the lifting device and cargo when the vehicle is traveling.

6 Claims, 9 Drawing Sheets

HIGH-STRENGTH VEHICLE-MOUNTED CARGO TRANSPORT APPARATUS

FIELD OF THE INVENTION

The present invention relates to the field of removable high-strength vehicle-mounted cargo transport devices.

BACKGROUND

Vehicle owners have always sought out a better way to mount an apparatus to their vehicle for transporting cargo including bicycles, wheel chairs, tool boxes, motorcycles, personal watercrafts and all terrain vehicles. Information relevant to address this problem can be found in U.S. Pat. Nos. 4,084,736, 4,738,581, 4,741,660, 4,775,282, 5,011,361, 5,431,522, 5,482,424, 5,806,737, 5,816,763, 5,984,613, 6,007,290, and D430,533. Each one of these references suffers from one or more of the disadvantages described in the following paragraphs.

Each of the references that employs a lifting device to raise the cargo off the ground and into the desired traveling position relies solely on the lifting device to support the cargo when the vehicle is traveling. This is a disadvantage because the lifting device must be designed not only to lift the cargo off the ground and into the desired traveling position, but the lifting device must also support the additional impact forces on the lifting device encountered when the vehicle is traveling. The additional impact forces on the lifting device during travel can occur for a variety of reasons, including bumps in the road, potholes, vehicle acceleration and vehicle deceleration.

The additional impact forces on the lifting device during travel are magnified when the vehicle is driven on non-paved roads ("off-road") because of the uneven and often unpredictable driving surface encountered in off-road situations. Vehicle owners transporting cargo such as motorcycles, all terrain vehicles and personal watercraft often drive their vehicle and cargo off-road.

The increased downward forces on the lifting device during travel require that the cargo-lifting device must be designed not only to lift the cargo itself, but also support the cargo during travel. If the lifting device was used only to lift the cargo into the traveling position and not support the additional downward forces during travel, the lifting device could be smaller, lighter and less expensive.

Another disadvantage of the references that employ a lifting device to raise the cargo into the traveling position is that those references use the lifting device as the sole means for supporting the cargo during travel. This is a significant disadvantage because if the lifting device fails while the vehicle is traveling, significant damage could result to the cargo, the vehicle, the driver, any passengers in the vehicle, nearby pedestrians or nearby vehicles. A solution that provides redundant support for the cargo if the lifting device fails during travel would be a significant advantage.

Another disadvantage of the references is that many of them are aimed at the lighter weight cargo (i.e., bicycles, wheelchairs, and toolboxes). Heavier cargo, such as motorcycles, personal watercrafts and all terrain vehicles are many times heavier than the heaviest electric wheel chair. Accordingly, many of the proposed solutions for transporting lighter weight cargo are not appropriate and can not support heavier cargo.

Another disadvantage of the references is that it takes more than one person to mount the transport apparatus to the vehicle and more than one person to load the cargo. A solution that allowed one person to complete the process without assistance would be a significant improvement.

Presently, no solution is known that (1) relieves the lifting device from the additional downward impact forces encountered during travel, (2) provides redundant support for the cargo if the lifting means failed during travel, or (3) allows one person to mount the apparatus to the vehicle and load the cargo. For the foregoing reasons, a need exists for a high strength vehicle-mounted transport apparatus that allows for a smaller capacity lifting device, provides redundant support during travel, and can be installed by one person.

SUMMARY

The present invention is directed to an apparatus and method that satisfies the need to relieve the lifting device from the additional downward impact forces encountered during travel. By doing so, this invention allows for a smaller capacity lifting device than would otherwise be required if the lifting device had to bear the additional downward forces during travel in addition to the force required to lift the cargo into the traveling position.

This invention also satisfies the need to provide redundant support for the cargo if the lifting device fails during travel. By doing so, this invention significantly reduces the likelihood of an accident during travel if the lifting device failed during travel. In addition, the invention balances the cargo load better by distributing the load on the vehicle.

This invention also satisfies the need for a solution where one person can mount the transport apparatus to the vehicle and load the cargo onto the transport apparatus without assistance.

This invention is a cargo transport apparatus for mounting on a vehicle, where the cargo transport apparatus comprises a lifting device detachably connected to the vehicle and at least one load-bearing member detachably connected to the vehicle. The lifting device comprises a cargo holding area where the cargo has at least two positions: a traveling position and a loading position. At least one load-bearing member is connected to the vehicle so that at least one load-bearing member supports the lifting device in the traveling position.

This invention is also a method for increasing the load-bearing capacity of a cargo transport apparatus for mounting on a vehicle, which comprises the following acts (steps). First, connect a lifting device to the vehicle, where the lifting device further comprises a cargo holding area, and the cargo holding area further comprises a traveling position and a loading position. Second, place the cargo holding area in the loading position. Third, place cargo on the cargo holding area. Fourth, raise the lifting device into to a position above the traveling position. Fifth, connect at least one load-bearing member to the vehicle in a location where at least one load-bearing member supports the lifting device when the lifting device is in the traveling position. And sixth, lower the lifting device onto at least one load-bearing member.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings.

Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the word "function" or "means" in the Description is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6.

Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

These and other features, aspects, and advantages of the present invention will become better understood with reference to the following description, appended claims and accompanying drawings where:

DESCRIPTION

As set forth in more detail in the following paragraphs, the invention is a cargo transport apparatus that can be mounted on a vehicle. The cargo transport apparatus comprises two main features: (1) a lifting device detachably connected to the vehicle such that cargo can be placed on the lifting device in the down or loading position and then raised upwards into the up or traveling position, and (2) at least one load beam detachably connected to the vehicle to support the lifting device and the cargo when the cargo holding area is in the traveling position.

The lifting device can be satisfactorily designed in a variety or ways, using a variety of materials. In the preferred embodiment, three important features of the lifting device are: (1) the lifting device should be attached to the vehicle directly or to the vehicle's receiver-type hitch, (2) the lifting device should contain a place upon which cargo can be loaded (referred to in the claims as a "cargo holding area"), and (3) the lifting device should be capable of moving between the loading position and the traveling position.

A machine can be connected to the lifting device for assistance in raising and lowering the cargo holding area. If used, the machine should be capable of raising the cargo holding area to a vertical position above the traveling position and the machine is capable of lowering the cargo holding area to a vertical position at least as low as the loading position.

In addition, a receiving apparatus can be detachably connected to the vehicle in a location where the load-supporting member can be connected to the receiving apparatus to support the lifting device in the traveling position. The load beam could then be detachably connected to the receiving apparatus to support the lifting device and the cargo when the cargo holding area is in the traveling position. If more than one receiving apparatus and/or load supporting member is used, both the receiving apparatus and load-bearing members should be spaced apart so that the load is evenly distributed between them.

In the preferred embodiment, the lifting device comprises a lower mast 3, a motor mast 10, a right fork support assembly 20, a left fork support assembly 21, a right fork 30, a left fork 31, a fork support roller 42, a linear actuator 65, a load-measuring device, a power cord 60, and a cargo holding area in the preferred form of a cargo platform (85, 90 or 95).

The lower mast 3 is L-shaped, with a shorter section and a longer section. The lower mast 3 is constructed from square, tube steel such that the shorter end fits into a standard-size, square receiver hitch 50. A mount for the piston of a linear actuator 65 is welded to the top of the longer section to accept the piston of the linear actuator.

The motor mast 10 has an upper and a lower end and is also constructed with square tube steel. The lower end of the motor mast slides over the longer end of the lower mast. The linear actuator motor 65 is attached to the upper end of the motor mast and the piston of the linear actuator projects downward inside the motor mast and. connects to the mount on the top of the longer section of the lower mast.

Rectangular steel plates 16 and 17 to receive the right fork support assembly 20 and left fork support assembly 21 are connected by a method such as welding to the left and right sides of the lower end of the motor mast. The steel plates should extend backwards from the motor mast to allow a line of holes to be drilled through the plate to receive the left and right support assemblies respectively. These pre-drilled holes allow for height adjustment of the lifting device to accommodate different heights of vehicles.

Figure 1:
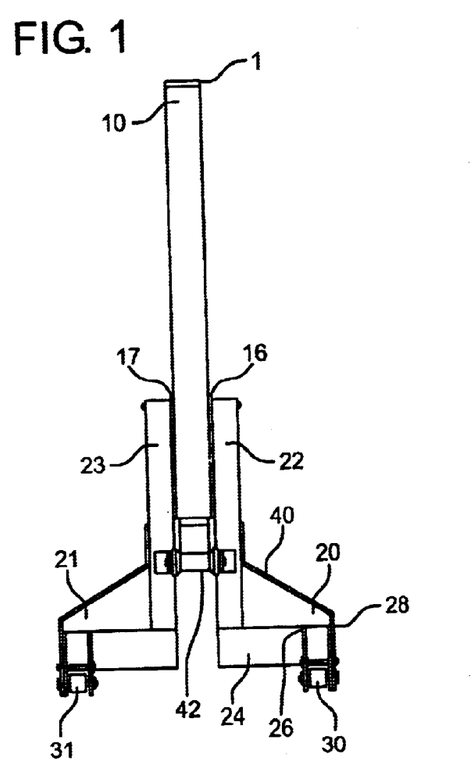
FIG. 1 shows a front elevation view of the lifting device in the down or loading position, without the detachable cargo holding area attached.
Figure 2:
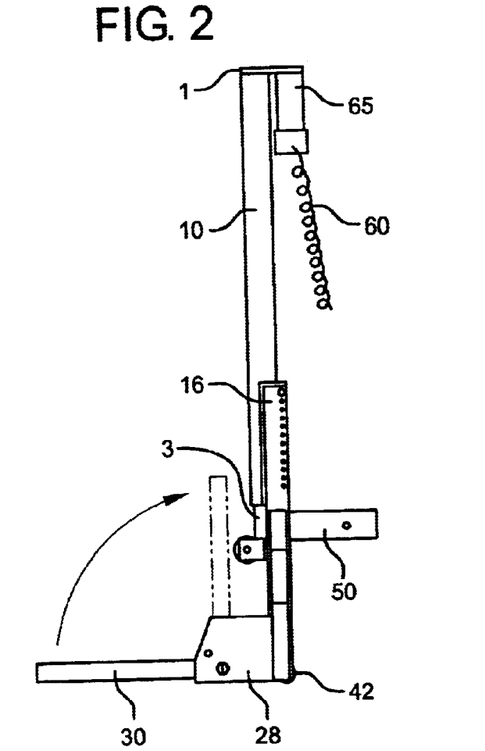
FIG. 2 shows a side view of the lifting device shown in FIG. 1.
Figure 3:
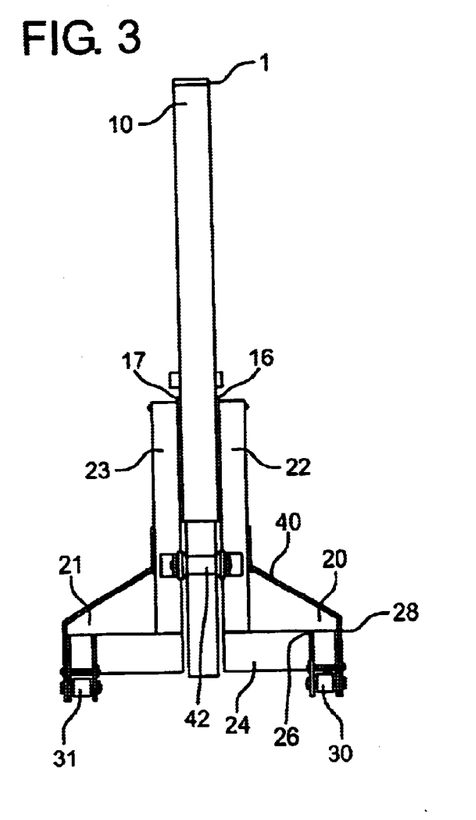
FIG. 3 shows a front elevation view of the lifting device in the up or traveling position, without the detachable cargo holding area attached.
Figure 4:
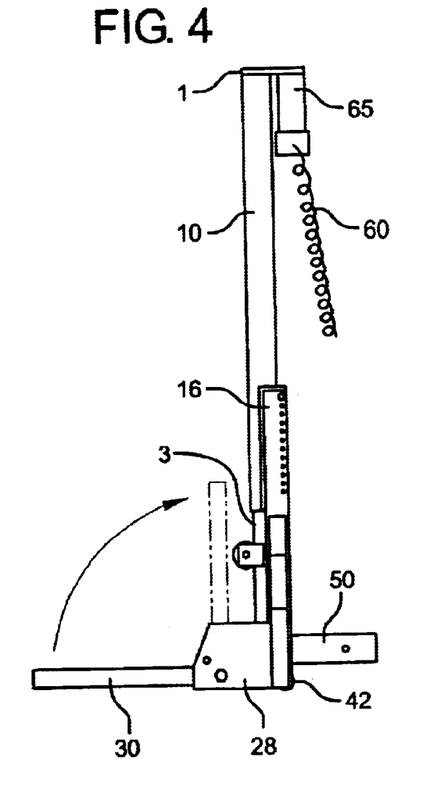
FIG. 4 shows a side view of the lifting device shown in FIG. 3.
Figure 5:
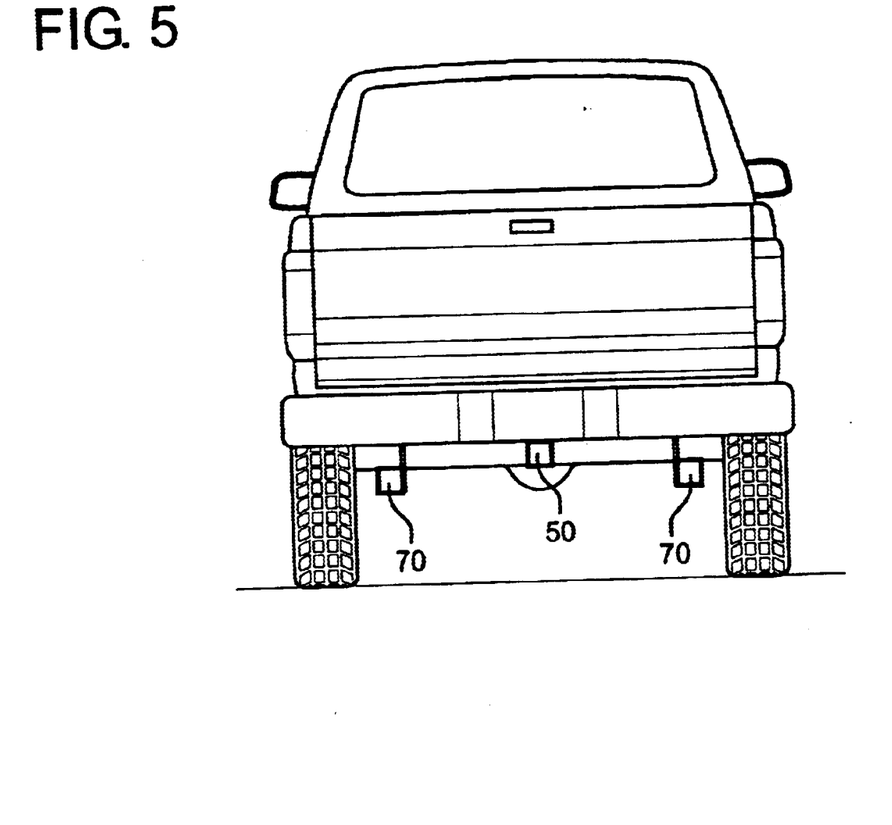
FIG. 5 shows a rear view of the vehicle with a trailer hitch attached and two receiving apparatus attached.
Figure 6:
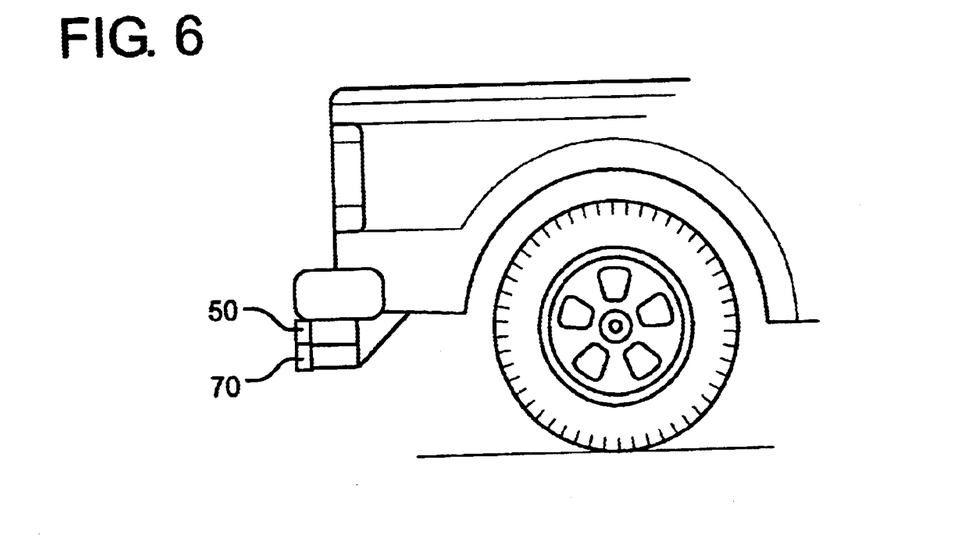
FIG. 6 shows a side view of the vehicle shown in FIG. 5.
Figure 7:
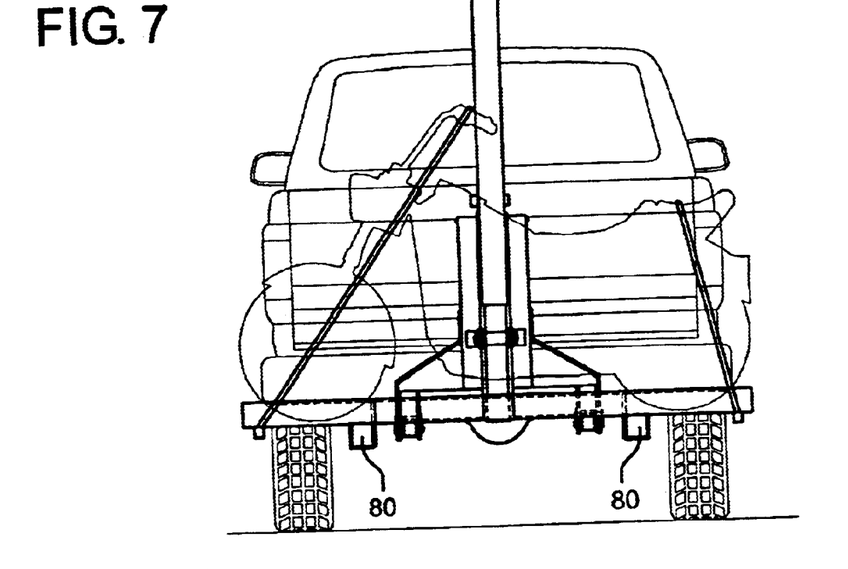
FIG. 7 shows a rear view of the vehicle and the cargo transport apparatus attached to the vehicle. The cargo holding area is loaded with a motorcycle loaded and raised to the traveling position. Two load beams are inserted into their respective receiving apparatus beneath the cargo holding area for support.
Figure 8:
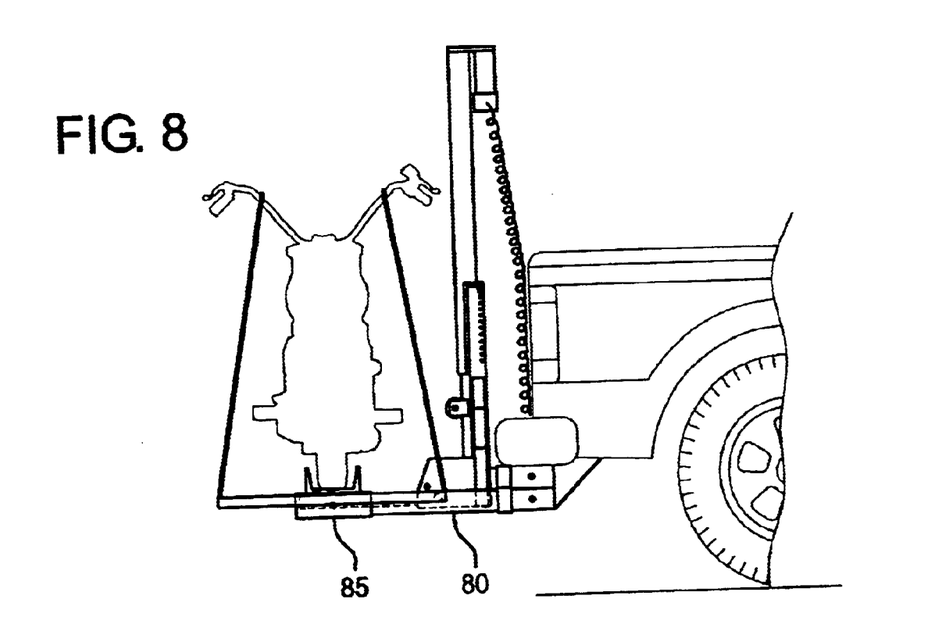
FIG. 8 shows a side view of FIG. 7.
Figure 9:
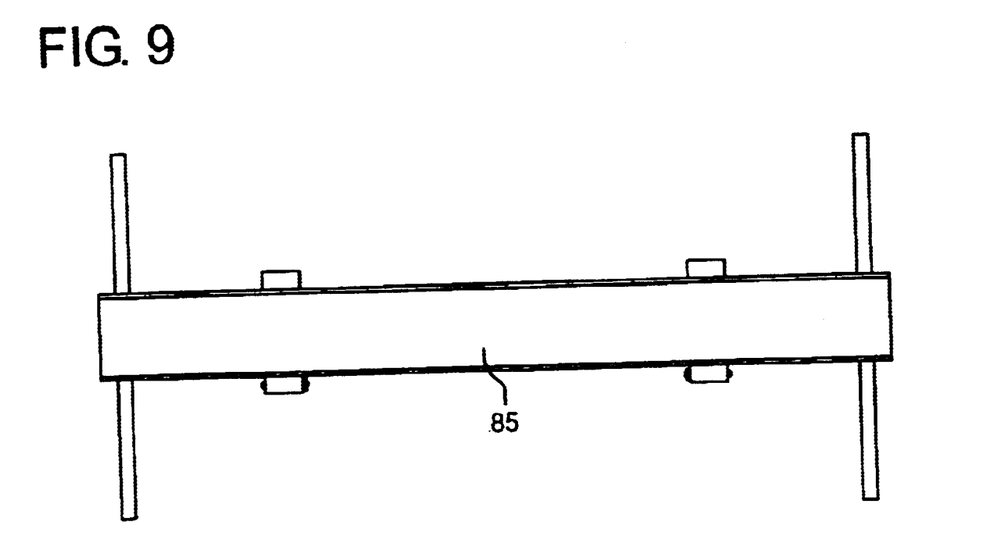
FIG. 9 shows a top view of a cargo holding area for a motorcycle.
Figure 10:
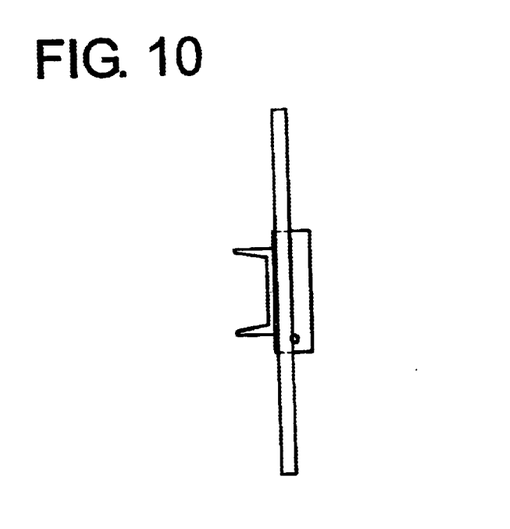
FIG. 10 shows a side view of the motorcycle cargo holding area of FIG. 9.
Figure 11:
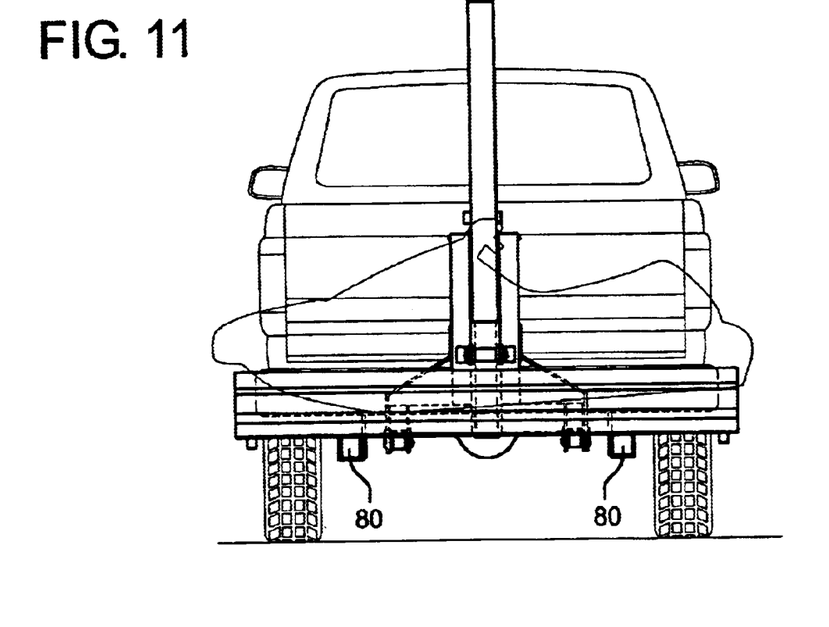
FIG. 11 shows a rear view of the vehicle and the cargo transport apparatus attached to the vehicle. The cargo holding area is loaded with a personal watercraft and raised to the traveling position. Two load beams are inserted beneath the cargo holding area for support.
Figure 12:
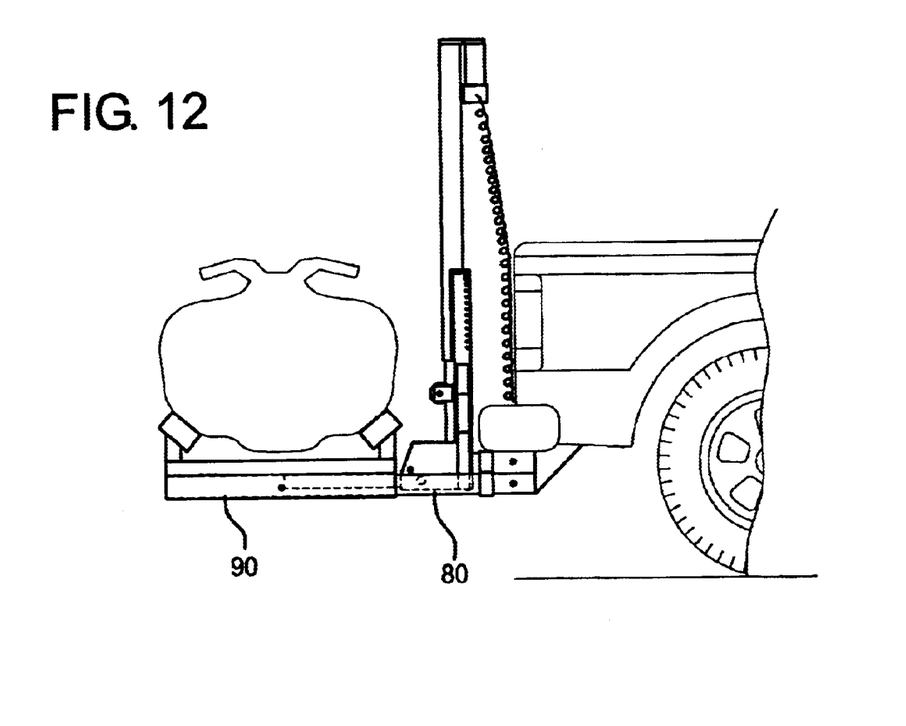
FIG. 12 shows a side view of FIG. 11.
Figure 13:
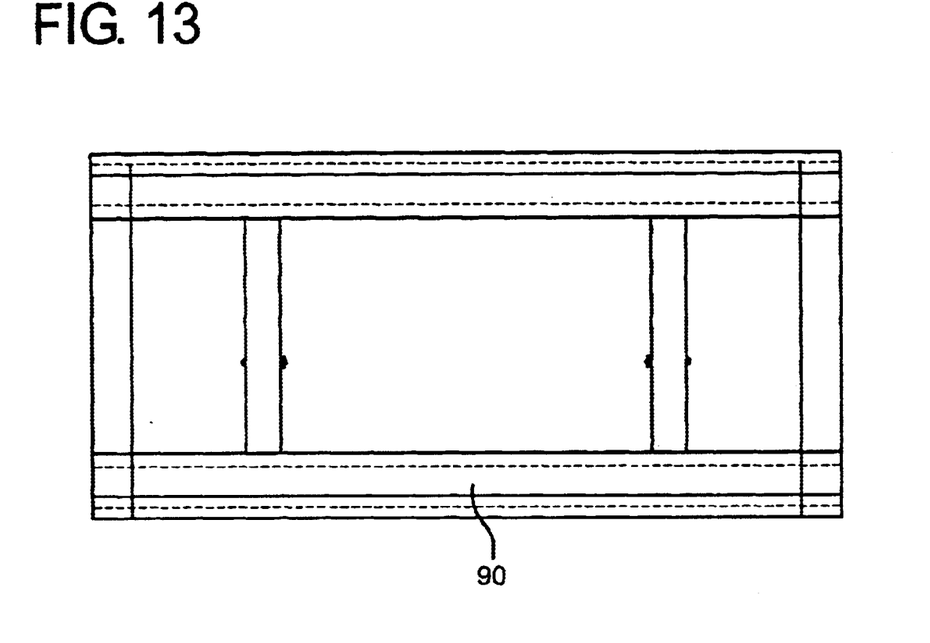
FIG. 13 shows a top view of a cargo holding area for a personal watercraft.
Figure 14:
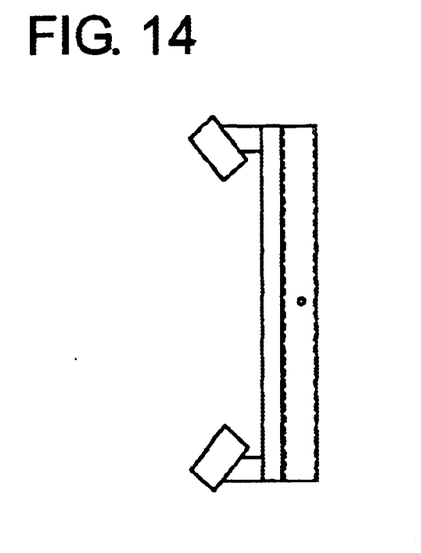
FIG. 14 shows a side view of the personal watercraft cargo holding area of FIG. 13.
Figure 15:
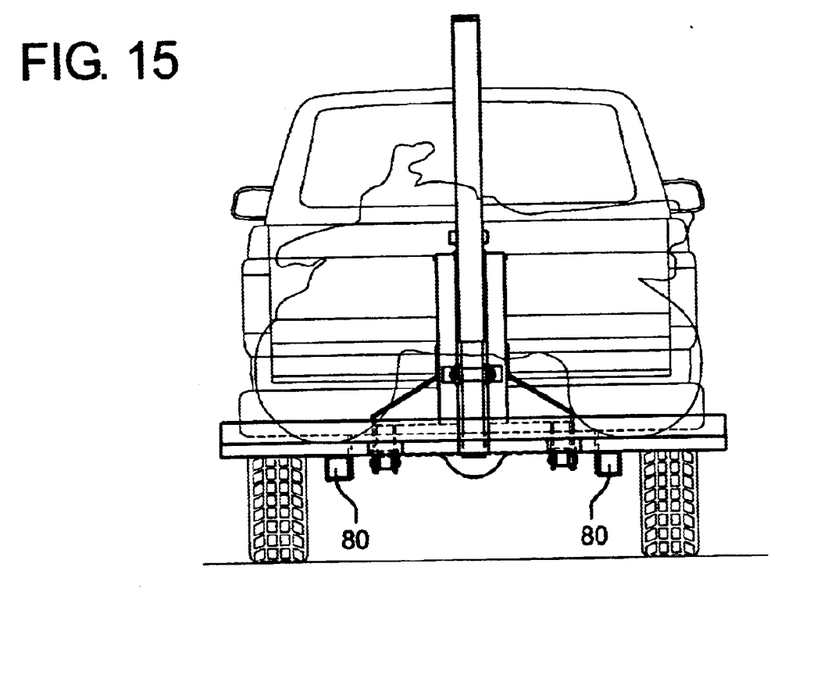
FIG. 15 shows a rear view of the vehicle and the cargo transport apparatus attached to the vehicle. The cargo holding area is loaded with an all terrain vehicle and raised to the traveling position. Two load beams are inserted beneath the cargo holding area for support.
Figure 16:
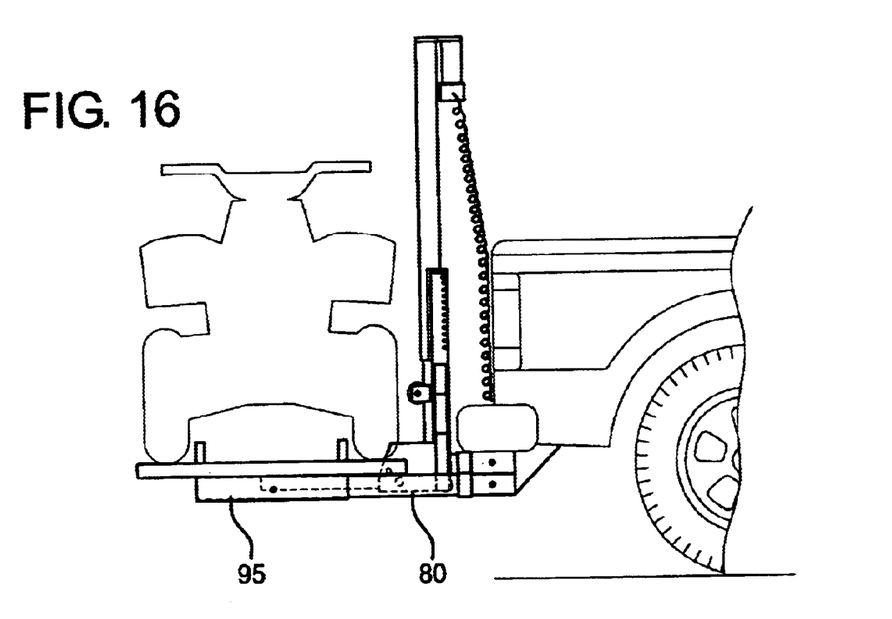
FIG. 16 shows a side view of FIG. 15.
Figure 17:
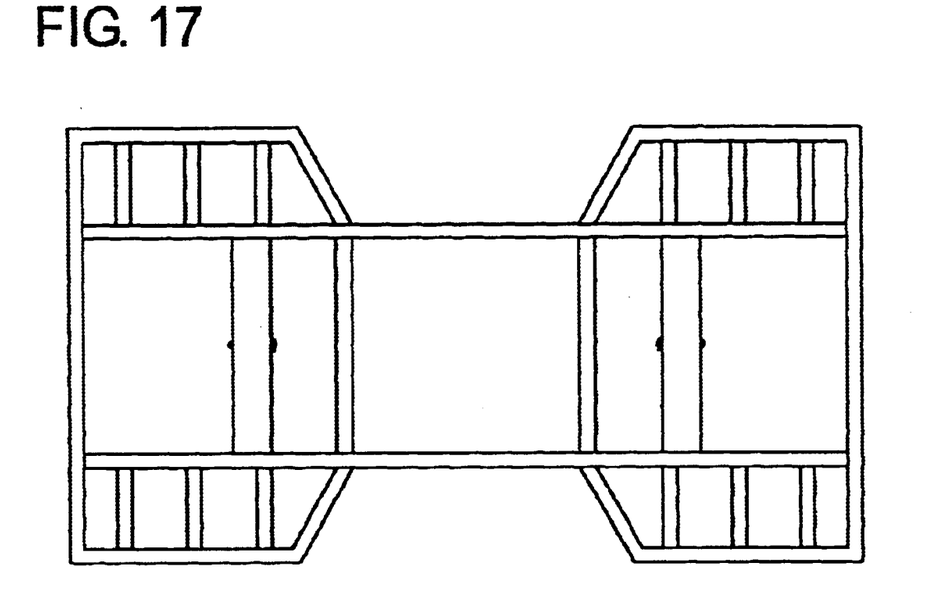
FIG. 17 shows a top view of a cargo holding area for an all-terrain vehicle.
Figure 18:
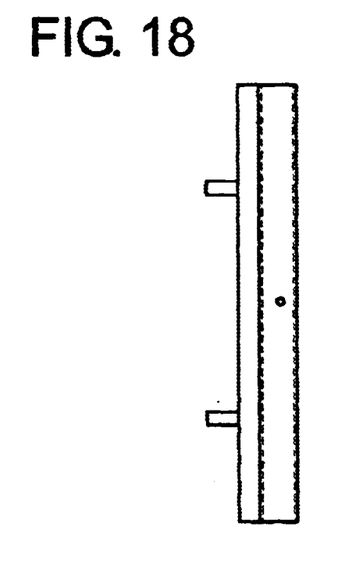
FIG. 18 shows a side view of the all-terrain vehicle cargo holding area of FIG. 17.

The left and right fork assemblies are mirror images of each other. Accordingly, only the right fork assembly will be described. As shown in FIG. 1, the right fork assembly contains a steel angle 22 with a longer leg and a shorter leg. The angle is aligned in a vertical position where the longer leg in directed toward the vehicle and contains a line of holes that match up with the left plate of the motor mast 10. A square steel tube 24 is connected to the bottom of the angle as shown in FIG. 1. An outer fork plate 26 and an inner fork plate 28 are connected to in a vertical alignment to the front side and the right end of the square steel tube. The outer and inner fork plates are spaced at a dimension to allow the right fork 30 to be pinned between them. This allows the forks to rotate upward 90 degrees for compact storage when the apparatus is not loaded with cargo.

Additional bracing angles can be installed between the inner and outer forks for greater stability and strength. A bracing member 40 can be connected between the outer fork plate and the steel angle for additional support as shown in FIG. 1. Finally, a lower mast roller guide 42 is connected to the vertical angles 22 and 23 of the right and left fork support assemblies to help guide the lower mast inside the motor mast.

In the preferred embodiment, a cargo holding area in the form of a detachable cargo platform is then connected to the left and right forks. The cargo holding area may be rectangular with or without sides to accommodate a variety of cargo. In the preferred embodiment of the invention, however, the cargo holding area is designed and manufactured for a particular cargo. FIGS. 7–10 illustrate a cargo holding area designed for a motorcycle holding area. FIGS. 11–14 illustrate a cargo holding area designed for a personal watercraft. FIGS. 15–18 illustrate a cargo holding area designed for an all terrain vehicle.

The shorter end of the lower mast can be attached to the vehicle by a variety of methods, such as sliding the lower-mast into the vehicle's receiver-type trailer hitch. The preferred embodiment is an L-shaped lower mast 3 constructed from square tube steel such that the bottom section fits into a standard size square receiver hitch 50. The lower mast is then fastened to the receiver hitch.

In the preferred embodiment of the invention, two wheels are attached to the bottom of the left and right support brackets so that the lifting device may be rolled into and out of position. These wheels allow one person to roll the lifting device—much like one would roll a hand truck—from storage to the vehicle and then back to storage.

A machine can be connected to the lifting device to assist moving the cargo holding area between the loading position and the traveling position. The machine may be powered manually, electrically, by a gas engine or by another suitable energy source. The preferred embodiment is electric power and the machine is a linear actuator. In this version, an electric cord 60 is connected to the vehicle's battery. The other end of the cord is connected to the linear actuator.

In the preferred embodiment, two receiving apparatus 70 are detachably connected to the vehicle's frame or the frame of the trailer hitch in a location where the load-supporting members can be inserted into each of the receiving apparatus to support the lifting device in the traveling position as shown, for example in FIGS. 7, 8, 11, 12, 15, and 16. Each of the receiving apparatus should be capable of receiving a load-bearing member. If more than one receiving apparatus and load supporting member is used, both the receiving apparatus and load-bearing members should be spaced apart so that the load of the lifting device and cargo is evenly distributed between them.

After the lifting device 1 is connected to the vehicle, the cargo holding area is placed in the loading position and cargo is placed on the cargo holding area. In the preferred embodiment, straps may be detachably connected to the cargo holding area so that cargo may be secured to the holding area. The cargo is then raised to a point slightly above the traveling position. Next, at least one load-bearing member 80 is connected to the vehicle. In the preferred embodiment, the two load-bearing members are inserted into their corresponding receiving apparatus and the cargo holding area 85, 90, or 95 is then lowered onto the load-bearing members 80.

In the preferred version of the invention, a load-measuring device is connected to the lifting device and load-bearing members. When the cargo holding area is lowered, the load-measuring device is used to distribute the cargo load between the load-bearing members and the lifting device.

The details of the invention have been set forth in the above description and drawings. Although any methods and materials similar or equivalent to those described herein can be used in the practice or testing of the present invention, the preferred methods and materials have been described. Other features, object, and advantages of the invention will be apparent from the description and from the claims. In the specification and the claims, the singular forms include plural referents unless the context clearly requires otherwise. Unless defined otherwise, all technical and scientific terms used herein have the same meaning as commonly understood by one of ordinary skill in the art to which this invention belongs.

The preferred embodiment of the invention is described above in the Drawings and Description. While these descriptions directly describe the above embodiments, it is understood that those skilled in the art may conceive modifications and/or variations to the specific embodiments shown and described herein. Any such modifications or variations that fall within the purview of this description are intended to be included therein as well. The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A method for increasing the load-bearing capacity of a cargo transport apparatus for mounting on a vehicle, which comprises the steps of:

a) connecting a lifting device to the vehicle, the lifting device further comprising a cargo holding area, the cargo holding area further comprising a left fork and a right fork, the cargo holding area variable between a traveling position and a loading position;

b) placing the cargo holding area in the loading position, c) placing cargo on the cargo holding area;

d) raising the lifting device to a position above the traveling position;

e) connecting at least one load-bearing member to the vehicle in a location where at least one load-bearing member supports the lifting device when the lifting device is in the traveling position; and, f) lowering at least one of the right fork or the left fork onto the at least one load-bearing member.

2. The method for increasing the load capacity of the cargo transport apparatus of claim 1, further comprising the steps of connecting a machine to the lifting device; using the machine to raise the cargo holding area to a position above the traveling position; and, using the machine to lower the cargo holding area to a vertical position at least as low as the loading position.

3. The method for increasing the load capacity of the cargo transport apparatus of claim 1, further comprising the steps of connecting a stress-measuring device to the at least one load-bearing member and to the lifting device so that the load carried by the lifting device and the load carried by at least one load-bearing member can be distributed between the lifting device and at least one load-bearing member.

4. A method for increasing the load-bearing capacity of a cargo transport apparatus for mounting on a vehicle, which comprises the steps of:

a) connecting a lifting device to the vehicle, the lifting device further comprising a cargo holding area, the cargo holding area further comprising a traveling position and a loading position;

b) connecting at least one receiving apparatus to the vehicle in a location where at least one load-bearing member can be connected to at least one receiving apparatus and at least one load-bearing member can support the lifting device when the lifting device is in the traveling position;

c) placing the cargo holding area in the loading position;

d) placing cargo on the cargo holding area;

e) raising the lifting device to a position above the traveling position;

f) connecting at least one load-bearing member to the receiving apparatus; and, g) lowering at least one of the right fork or the left fork onto the at least one load-bearing member.

5. The method for increasing the load capacity of the cargo transport apparatus of claim 4, further comprising the steps of connecting a machine to the lifting device; using the machine to raise the cargo holding area to a position above the traveling position; and, using the machine to lower the cargo holding area to a vertical position at least as low as the loading position.

6. The method for increasing the load capacity of the cargo transport apparatus of claim 4, further comprising the steps of connecting a stress-measuring device to the load-bearing member and to the lifting device so that the load carried by the lifting device and the load carried by the load-bearing member can be distributed between the lifting device and the load-bearing member.

* * * * *